(12) United States Patent
Lv et al.

(10) Patent No.: US 10,782,823 B2
(45) Date of Patent: Sep. 22, 2020

(54) TOUCH DETECTION DEVICE AND TOUCH DETECTION METHOD THEREOF

(71) Applicants: BOE Technology Group Co., Ltd., Beijing (CN); HEFEI BOE OPTOELECTRONICS TECHNOLOGY CO., LTD., Hefei, Anhui (CN)

(72) Inventors: Lei Lv, Beijing (CN); Bo Liu, Beijing (CN); Fei Xu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/129,498

(22) Filed: Sep. 12, 2018

(65) Prior Publication Data

US 2019/0171329 A1   Jun. 6, 2019

(30) Foreign Application Priority Data

Dec. 5, 2017 (CN) .......................... 2017 1 1271235

(51) Int. Cl.
*G06F 3/041* (2006.01)
*G06F 1/3215* (2019.01)

(52) U.S. Cl.
CPC .......... *G06F 3/0416* (2013.01); *G06F 1/3215* (2013.01); *G06F 3/0412* (2013.01); *G06F 3/04166* (2019.05)

(58) Field of Classification Search
CPC .... G06F 1/3215; G06F 3/0412; G06F 3/0416; G06F 3/04166
See application file for complete search history.

(56) References Cited

U.S. PATENT DOCUMENTS

| 2009/0207154 A1* | 8/2009 | Chino | G06F 3/0416 345/175 |
| 2017/0052635 A1* | 2/2017 | Yu | G06F 3/044 |
| 2017/0090635 A1* | 3/2017 | Kim | G06F 3/0412 |

FOREIGN PATENT DOCUMENTS

| CN | 103558941 A | 2/2014 |
| CN | 104793775 A | 7/2015 |
| CN | 105630234 A | 6/2016 |
| JP | 2016033698 A | 3/2016 |

OTHER PUBLICATIONS

Office Action issued in corresponding Chinese Patent Application No. 201711271235.4, dated May 21, 2020.

\* cited by examiner

*Primary Examiner* — Insa Sadio
(74) *Attorney, Agent, or Firm* — McDermott Will & Emery LLP

(57) ABSTRACT

Embodiments of the present disclosure include a touch detection method and a touch detection device. The touch detection method includes: performing, by a touch detector, a touch scan detection at a first detection frequency; and switching, by the touch detector to perform the touch scan detection at a second detection frequency in response to a touch point that is detected by the touch detector, wherein the second detection frequency is higher than the first detection frequency.

18 Claims, 3 Drawing Sheets

TOUCH DETECTION DEVICE AND TOUCH DETECTION METHOD THEREOF

CROSS-REFERENCE TO RELATED APPLICATION(S)

This application claims priority to Chinese Application No. 201711271235.4, entitled "TOUCH DETECTION DEVICE AND TOUCH DETECTION METHOD THEREOF" and filed on Dec. 5, 2017, which is incorporated herein by reference in its entirety.

TECHNICAL FIELD

The present disclosure relates to the field of touch technology, and in particular to a touch detection method and a touch detection device.

BACKGROUND

The most significant feature of TDDI (Touch and Display Driver Integration) products is integration of touch chips and display chips in a single chip. Currently, the touch detection technology includes 60 Hz LVB (Long Vertical Blank) technology and 120 Hz LHB (Long Horizontal Blank) technology.

SUMMARY

An embodiment of the present disclosure provides a touch detection method, including: performing, by a touch detector, a touch scan detection at a first detection frequency; and switching, by the touch detector to perform the touch scan detection at a second detection frequency in response to that a touch point is detected by the touch detector, wherein the second detection frequency is higher than the first detection frequency.

According to an embodiment of the present disclosure, the touch detection method further comprises: switching to perform the touch scan detection at the first detection frequency if no touch point is detected by the touch detector for a preset period.

According to an embodiment of the present disclosure, a touch scan period during which the touch scan detection is performed at the first detection frequency is different in location in a frame from that during which the touch scan detection is performed at the second detection frequency.

According to an embodiment of the present disclosure, the touch scan period is interlaced within a display scan period of a frame scan period.

According to an embodiment of the present disclosure, the touch scan period is interlaced within a blank period of a frame scan period.

According to an embodiment of the present disclosure, the touch scan period is interlaced within a blank period and a display scan period of a frame scan period.

According to an embodiment of the present disclosure, the first detection frequency is lower than or equal to a display refresh frequency.

According to an embodiment of the present disclosure, the first detection frequency is one half or one quarter of the display refresh frequency.

According to an embodiment of the present disclosure, the second detection frequency is higher than a display refresh frequency.

According to an embodiment of the present disclosure, the second detection frequency is twice the display refresh frequency.

An embodiment of the present disclosure provides a touch detection device, including: a controller configured to control a touch detector to perform a touch scan detection; and the touch detector configured to perform a touch scan detection at a first detection frequency under the control of the controller; and switch to perform the touch scan detection at a second detection frequency under the control of the controller in response to that a touch point is detected by the touch detector, wherein the second detection frequency is higher than the first detection frequency.

According to an embodiment of the present disclosure, the controller is further configured to: switch the touch detector to perform the touch scan detection at the first detection frequency if no touch point is detected by the touch detector for a preset period.

According to an embodiment of the present disclosure, a touch scan period during which the touch scan detection is performed at the first detection frequency is different in location in a frame from that during which the touch scan detection is performed at the second detection frequency.

According to an embodiment of the present disclosure, the touch scan period is interlaced within a display scan period of a frame scan period.

According to an embodiment of the present disclosure, the touch scan period is interlaced within a blank period of a frame scan period.

According to an embodiment of the present disclosure, the touch scan period is interlaced within a blank period and a display scan period of a frame scan period.

Features and advantages of the present disclosure will be set forth in the following description, and become partly obvious from the description or understood from implementing the present disclosure. Objects and other advantages of the present disclosure may be realized and obtained from structures specified in the description, claims and the accompany drawings of the present disclosure.

BRIEF DESCRIPTION OF THE DRAWINGS

The drawings are used to provide a further understanding of the technical solutions of the present disclosure, constitute a part of the specification and are used for explaining the technical solutions of the present disclosure along with the embodiments of the present application, and do not constitute any limitation of the technical solutions of the present disclosure.

DETAILED DESCRIPTION

Embodiments of the present disclosure will be described in detail below with reference to the accompanying drawings. It should be noted that the embodiments in the present disclosure and features in the embodiments may be arbitrarily combined with each other in a case of no conflict.

Steps illustrated in the flowchart of the drawings may be executed in a computer system containing e.g. a set of computer executable instructions. Also, although a logical sequence is shown in the flowchart, in some cases the steps shown or described may be performed in a different order than the one described herein.

Figure 1:
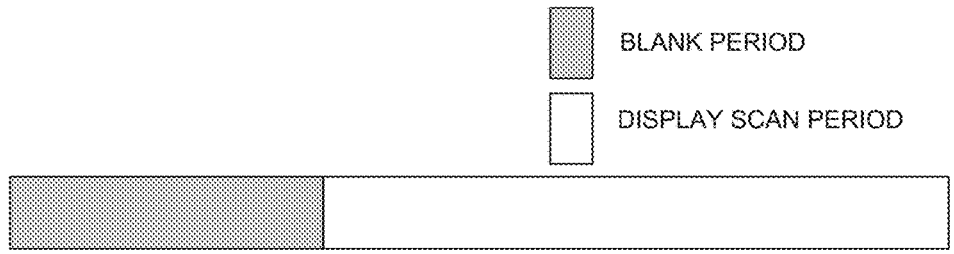
FIG. 1 is a schematic diagram of a structure of a frame scan period according to an embodiment of the present disclosure.

FIG. 1 is a schematic diagram of a structure of a frame scan period in a case that there is no touch scan period according to an embodiment of the present disclosure. As shown in FIG. 1, when there is no touch scan period, each frame scan period (i.e., each frame) includes one display scan period (a white portion as shown in FIG. 1) and a blank period (a light gray portion as shown in FIG. 1), in which there is no display in the blank period, and the display scan is performed only during the display scan period.

Figure 2:
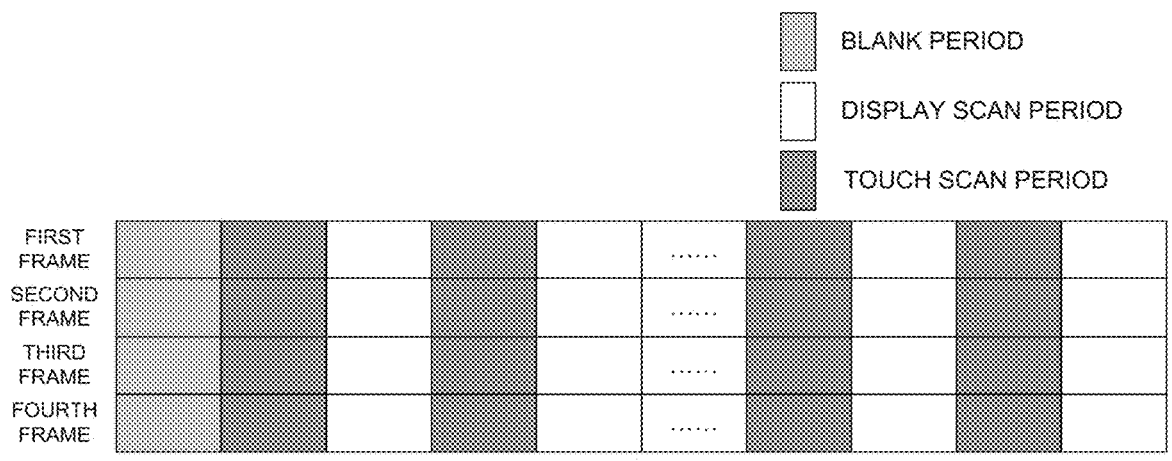
FIG. 2 is a schematic diagram of a structure of a frame scan period in a case that a touch scan period is interlaced within a display scan period of a frame scan period according to an embodiment of the present disclosure.

FIG. 2 is a schematic diagram of a structure of a frame scan period in a case that a touch scan period is interlaced within a display scan period of a frame scan period according to an embodiment of the present disclosure. As shown in FIG. 2, each frame scan period includes two or more display scan periods (such as a white portion as shown in FIG. 2) with a touch scan period inserted, one or more touch scan periods (a dark gray portion as shown in FIG. 2) and one blank period (a light gray part in FIG. 2). A touch scan period is interlaced within the display scan period of a frame scan period for performing the touch scan detection.

Figure 3:
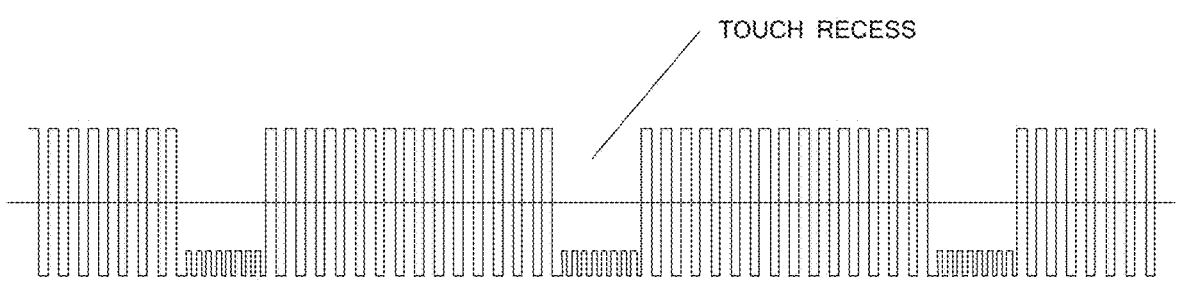
FIG. 3 is a schematic diagram of a touch detection waveform according to an embodiment of the present disclosure.

FIG. 3 is a schematic diagram showing a display scan waveform and a touch detection waveform in the case that the touch scan period is interlaced within the display scan period of a frame scan period as shown in FIG. 2. As shown in FIG. 3, in the case that the touch scan period is interlaced within the display scan period of a frame scan period, the touch scan waveform, i.e., a waveform at a touch recess, occurs in the display scan waveform.

States of the touch panel during the display scan and the touch scan are different due to factors, such as TFT leakage, common voltage pull in a touch area. Thus, a slight H-line (Horizontal-line) defect may occur at a boundary line between two adjacent display scan periods (i.e., the position of the touch recess, or the position where the touch scan waveform appears) on the touch panel. If positions of these horizontal lines are fixed, prolonged aging may cause change of display characteristics at the positions of the horizontal lines on the touch panel, resulting in severe horizontal lines similar to afterimages.

Figures 4, 5:
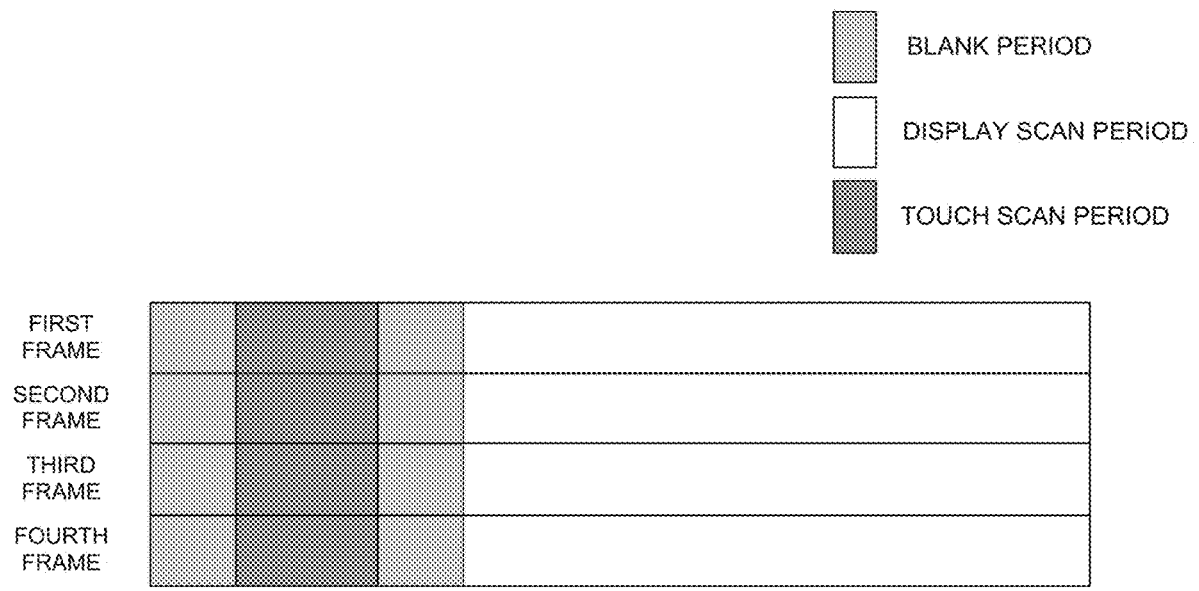
FIG. 4 is a schematic diagram of a structure of a frame scan period in a case that a touch scan period is interlaced within a blank period of a frame scan period according to an embodiment of the present disclosure.
FIG. 5 is a flowchart of a touch detection method according to an embodiment of the present disclosure.

FIG. 4 is a schematic diagram of a structure of a frame scan period in a case that a touch scan period is interlaced within a blank period of a frame scan period according to an embodiment of the present disclosure. As shown in FIG. 4, each frame scan period includes a display scan period (a white portion in FIG. 4), two blank periods with a touch scan period inserted (a light gray portion in FIG. 4) and one touch scan period (a dark gray portion in FIG. 4). Since the touch scan detection is performed in the blank period, the display scan waveform is not affected, and thus a normal display is not affected.

However, a frequency of touch detection is lower and a detection efficiency is lower, which is not good for a rapid response to the touch detection.

Referring to FIG. 5, an embodiment of the present disclosure provides a touch detection method, which includes steps 100 and 101.

In step 100, a touch detector performs a touch scan detection at a first detection frequency.

In the present embodiment, the first detection frequency may be lower than or equal to a display refresh frequency or a frame frequency. The display refresh frequency refers to a speed at which an image is updated on a screen, i.e., the number of times the image appears per second on the screen; and the frame frequency refers to the number of frames or images displayed per second. For example, the first detection frequency is one half or one quarter of the display refresh frequency or the frame frequency or an even lower frequency. For example, when the display refresh frequency or the frame frequency is 60 Hz, the first detection frequency is 60 Hz or 30 Hz or 15 Hz or lower. For example, when the first detection frequency is 30 Hz, the touch scan detection may be performed every two frames; and when the first detection frequency is 15 Hz, the touch detection may be performed every four frames.

In this way, in a case that no touch point is detected within a preset or a longer time, the touch detection is performed at a lower frequency. On one hand, the processing efficiency is improved, and power consumption is reduced; and on the other hand, the touch detection is performed at different detection frequencies in a case that there is a touch point and in a case that there is no touch point, so that the position of the horizontal line is not fixed, and no serious horizontal line will occur due to the prolonged aging.

In step 101, in response to that a touch point is detected by the touch detector, the touch detector is switched to perform the touch scan detection at the second detection frequency, wherein the second detection frequency is higher than the first detection frequency.

In the present embodiment, the second detection frequency may be higher than the display refresh frequency or the frame frequency. For example, the second detection frequency is twice the display refresh frequency or the frame frequency. For example, when the display refresh frequency or the frame frequency is 60 Hz, the first preset detection frequency is 120 Hz. In this way, when a touch point is detected, the touch detection is performed at a higher frequency, thereby improving the detection efficiency.

In the present embodiment, the touch scan period for performing the touch scan detection is interlaced within the display scan period of a frame scan period; or the touch scan period is interlaced within the blank period of a frame scan period; or the touch scan period is interlaced within the blank period and the display scan period of a frame scan period.

For example, each frame scan period (i.e., each frame) includes a display scan period, 10 touch scan periods and a blank period. Then, the touch scan period may be interlaced within the display scan period, or parts of the touch scan periods (for example, 5 touch scan periods) are interlaced within the display scan period, and parts of the touch scan periods are interlaced within the blank period.

Of course, the distribution of the touch scan period within a frame scan period depends on the first detection frequency and the second detection frequency. For example, when the touch scan detection is performed at the first detection frequency, the first detection frequency is one half of the display refresh frequency, and the touch scan period is interlaced within the display scan period, the touch scan period may be interlaced within the display scan period of a frame (i.e., of a frame scan period), or the touch scan period may be interlaced within the display scan period every two frames, so that the first detection frequency and the display refresh frequency satisfy the one-half relationship.

For example, when the touch scan detection is performed at the second detection frequency, the second detection frequency is twice the display refresh frequency or the frame frequency, and the touch scan period is interlaced within the display scan period, the touch scan period may be interlaced within the display scan period of each frame, so that the frequency of occurrence of the touch scan period is twice the display scan period. For another example, when the second detection frequency is the same as the display refresh frequency or the frame frequency, the touch scan period may be interlaced in the display scan period of each frame, so that the frequency of occurrence of the touch scan period is the same as that of the display scan period.

The particular interlaced manner is not intended to limit the protection scope of the embodiments of the present disclosure, and is not limited herein.

According to the embodiments of the present disclosure, the touch panel is in a non-touch state for most of time in normal use, that is, the touch scan detection is performed at the first detection frequency for most of the time, while the touch scan detection is performed at the second detection frequency for a short time. By switching detection frequencies of the touch scan detection, the position of the horizontal line is not fixed for a long time, thereby reducing the occurrence of the severe horizontal line caused by the prolonged aging. At the same time, since the second detection frequency is higher than the first detection Frequency, the detection efficiency is improved.

In order to ensure that the position of the horizontal line is not fixed for a long time, the following methods may be used.

The touch scan period during which the touch scan detection is performed at the first detection frequency is different in location in a frame from that during which the touch scan detection is performed at the second detection frequency.

For example, when the touch scan detection is performed at the first detection frequency, the touch scan period is interlaced within the display scan period of a frame scan period; when the touch scan detection is performed at the second detection frequency, the touch scan period is interlaced within the blank period of a frame scan period.

For another example, when the touch scan detection is performed at the first detection frequency, the touch scan period is interlaced in the blank period of a frame scan period; when the touch scan detection is performed at the second detection frequency, the touch scan period is interlaced in the display scan period of a frame scan period.

For another example, the touch scan periods corresponding to the two different detection frequencies are interlaced in the display scan period of a frame scan period, and the touch scan periods corresponding to the two different detection frequencies are interlaced at different positions within the frame scan period.

For another example, the touch scan periods corresponding to the two different detection frequencies are interlaced in the blank period of a frame scan period, and the touch scan periods corresponding to the two different detection frequencies are interlaced at different positions within the frame scan period.

Of course, the above example are merely a few implementable examples, and the particular implementations are not intended to limit the protection scope of the embodiments of the present disclosure.

Figure 6:
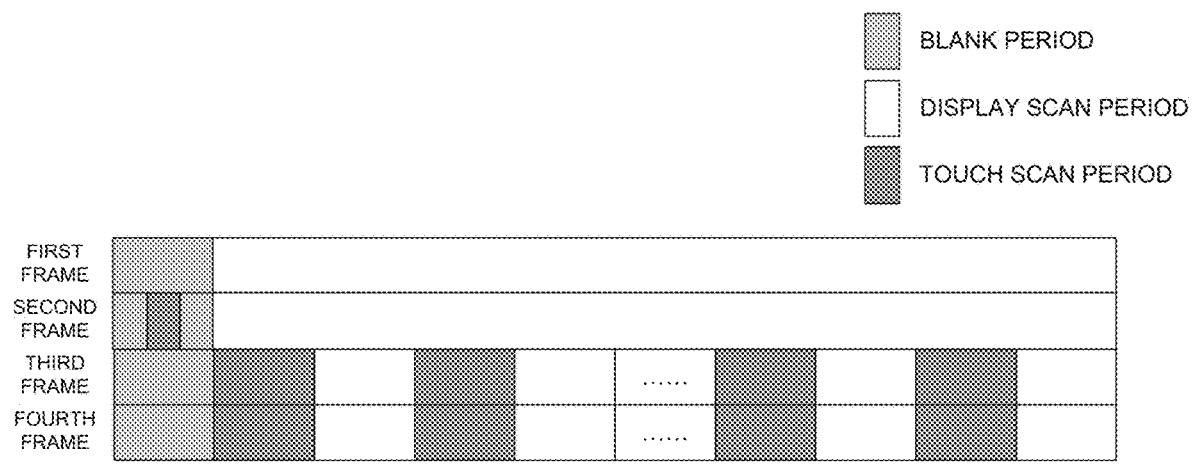
FIG. 6 is a schematic diagram of a structure of a frame scan period according to an embodiment of the present disclosure in a case that touch scan detection is performed at a touch detection method according to the embodiment of the present disclosure.

FIG. 6 is a schematic diagram of a frame scan period in which the touch detection is performed using the touch detection method of an embodiment of the present disclosure. As shown in FIG. 6, the touch scan detection is performed at the first frequency. As shown in FIG. 6, in the first frame and the second frame, the touch scan period is not interlaced within the first frame scan period, and interlaced only within the blank period of the second frame scan period. If a touch point is detected, the touch scan detection is performed at the second detection frequency. As shown in FIG. 6, the touch scan period is interlaced within the display scan period of each frame scan period in the third and fourth frames.

Alternatively, the method further includes: switching to perform the touch detection at the first detection frequency if no touch point is detected by the touch detector for a preset period.

With this solution, the overall power consumption of the touch display panel is reduced.

Figure 7:
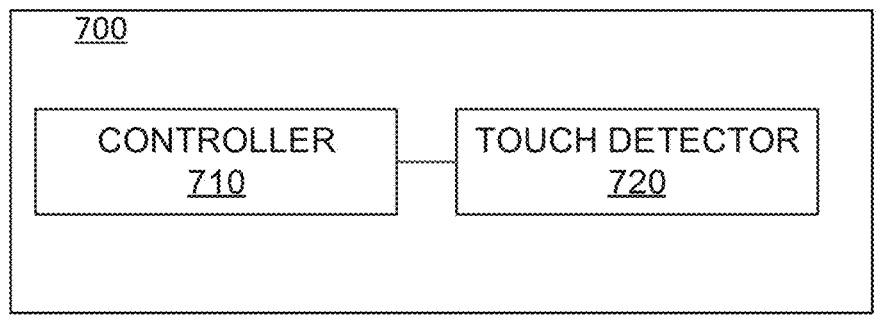
FIG. 7 is a schematic diagram of a structure of a touch detection device according to an embodiment of the present disclosure.

FIG. 7 is a schematic diagram of a touch detection device 700 according to an embodiment of the present disclosure. As shown in FIG. 7, the touch detection device 700 includes: a controller 710 configured to control a touch detector to perform a touch scan detection; and a touch detector 720 configured to perform a touch scan detection at a first detection frequency under the control of the controller 710; and switch to perform the touch scan detection at a second detection frequency under the control of the controller in response to that a touch point is detected by the touch detector 720, wherein the second detection frequency is higher than the first detection frequency.

Alternatively, the controller 710 is further configured to: switch the touch detector 720 to perform the touch detection at the first detection frequency if no touch point is detected by the touch detector 720 for a preset period.

In the present embodiment, the first detection frequency may be lower than or equal to the display refresh frequency or the frame frequency. The display refresh frequency refers to a speed at which an image is updated on a screen, i.e., the number of times the image appears per second on the screen; and the frame frequency refers to the number of frames or images displayed per second. For example, the first detection frequency is one half or one quarter of the display refresh frequency or the frame frequency or an even lower frequency. For example, when the display refresh frequency or the frame frequency is 60 Hz, the first detection frequency is 60 Hz or 30 Hz or 15 Hz or lower. For example, when the first detection frequency is 30 Hz, the touch scan detection may be performed every two frames; and when the first detection frequency is 15 Hz, the touch detection may be performed every four frames. In this way, in a case that no touch point is detected within a preset or a longer time, the touch detection is performed at a lower frequency. On one hand, the processing efficiency is improved, and power consumption is reduced; and on the other hand, the touch detection is performed at different detection frequencies in a case that there is a touch point and in a case that there is no touch point, so that the position of the horizontal line is not fixed, and no serious horizontal line will occur due to the prolonged aging.

In the present embodiment, the second detection frequency may be higher than the display refresh frequency or the frame frequency. For example, the second detection frequency is twice the display refresh frequency or the frame frequency. For example, when the display refresh frequency or the frame frequency is 60 Hz, the first preset detection frequency is 120 Hz. In this way, when a touch point is detected, the touch detection is performed at a higher frequency, thereby improving the detection efficiency.

In the present embodiment, the touch scan period for performing the touch scan detection is interlaced within the display scan period of a frame scan period; or the touch scan period is interlaced within the blank period of a frame scan period; or the touch scan period is interlaced within the blank period and the display scan period of a frame scan period.

In order to ensure that the position of the horizontal line is not fixed for a long time, the following methods may be used.

The touch scan period during which the touch scan detection is performed at the first detection frequency is different in location in a frame from that during which the touch scan detection is performed at the second detection frequency.

For example, when the touch scan detection is performed at the first detection frequency, the touch scan period is interlaced within the display scan period of a frame scan period; when the touch scan detection is performed at the second detection frequency, the touch scan period is interlaced within the blank period of a frame scan period.

For another example, when the touch scan detection is performed at the first detection frequency, the touch scan period is interlaced in the blank period of a frame scan period; when the touch scan detection is performed at the second detection frequency, the touch scan period is interlaced in the display scan period of a frame scan period.

For another example, the touch scan periods corresponding to the two different detection frequencies are interlaced in the display scan period of a frame scan period, and the touch scan periods corresponding to the two different detection frequencies are interlaced at different positions within a frame scan period.

For another example, the touch scan periods corresponding to the two different detection frequencies are interlaced in the blank period of a frame scan period, and the touch scan periods corresponding to the two different detection frequencies are interlaced at different positions within a frame scan period.

Of course, the above examples are merely a few implementable examples, and the particular implementations are not intended to limit the protection scope of the embodiments of the present disclosure.

The embodiments disclosed in the present disclosure are described above, but are merely used to facilitate to understand the present disclosure. The implementations thereof are not intended to limit the present disclosure. Any modifications and variations in forms and details of the implementations may be made by the skilled in the art without departing from the spirit and scope of the present disclosure. The scope of the present disclosure is defined by the appended claims.

We claim:

1. A touch detection method, comprising:
   performing, by a touch detector, a first touch scan detection at a first detection frequency; and
   switching, by the touch detector to perform a second touch scan detection at a second detection frequency in response to that a touch point is detected by the touch detector, wherein the second detection frequency is higher than the first detection frequency,
   wherein the first touch scan detection is performed at the first detection frequency during a first touch scan period, the second touch scan detection is performed at the second detection frequency during a second touch scan period, and the first touch scan period is configured to be at a different time from the second touch scan period within a frame period, and wherein
   for a current frame, it is determined to apply either the first touch scan detection or the second touch scan detection based on a touch scan detection result of a previous frame.

2. The touch detection method according to claim 1, wherein the method further comprises:
   switching to perform the first touch scan detection at the first detection frequency if no touch point is detected by the touch detector for a preset period.

3. The touch detection method according to claim 1, wherein the second touch scan period is interlaced within a display scan period of a frame scan period.

4. The touch detection method according to claim 1, wherein the first touch scan period is interlaced within a blank period of a frame scan period.

5. The touch detection method according to claim 1, wherein the first touch scan period is interlaced within a blank period of a frame scan period and the second touch scan period is interlaced with a display scan period of a frame scan period.

6. The touch detection method according to claim 1, wherein the first detection frequency is lower than or equal to a display refresh frequency.

7. The touch detection method according to claim 6, wherein the first detection frequency is one half or one quarter of the display refresh frequency.

8. The touch detection method according to claim 1, wherein the second detection frequency is higher than a display refresh frequency.

9. The touch detection method according to claim 8, wherein the second detection frequency is twice the display refresh frequency.

10. A touch detection device, comprising:
    a controller configured to control a touch detector to perform a touch scan detection; and
    the touch detector configured to perform a first touch scan detection at a first detection frequency under the control of the controller, and switch to perform a second touch scan detection at a second detection frequency under the control of the controller in response to that a touch point is detected by the touch detector, wherein the second detection frequency is higher than the first detection frequency,
    wherein the first touch scan detection is performed at the first detection frequency during a first touch scan period, the second touch scan detection is performed at the second detection frequency during a second touch scan period, and the first touch scan period is at a different time from the second touch scan period within a frame period, and wherein
    for a current frame, it is determined to apply either the first touch scan detection or the second touch scan detection based on a touch scan detection result of a previous frame.

11. The touch detection device according to claim 9, wherein the controller is further configured to:

switch the touch detector to perform the first touch scan detection at the first detection frequency if no touch point is detected by the touch detector for a preset period.

12. The touch detection device according to claim 10, wherein the second touch scan period is interlaced within a display scan period of a frame scan period.

13. The touch detection device according to claim 10, wherein the first touch scan period is interlaced within a blank period of a frame scan period.

14. The touch detection device according to claim 10, wherein the first touch scan period is interlaced within a blank period of a frame scan period and the second touch scan period is interlaced with a display scan period of a frame scan period.

15. The touch detection device according to claim 10, wherein the first detection frequency is lower than or equal to a display refresh frequency.

16. The touch detection device according to claim 15, wherein the first detection frequency is one half or one quarter of the display refresh frequency.

17. The touch detection device according to claim 10, wherein the second detection frequency is higher than a display refresh frequency.

18. The touch detection device according to claim 17, wherein the second detection frequency is twice the display refresh frequency.

* * * * *